(12) United States Patent
Kulshrestha et al.

(10) Patent No.: US 12,229,514 B2
(45) Date of Patent: Feb. 18, 2025

(54) SYSTEM AND METHOD FOR IDENTIFICATION AND CLASSIFICATION OF MULTILINGUAL MESSAGES IN AN ONLINE INTERACTIVE PORTAL

(71) Applicant: Extramarks Education India Pvt Ltd., Uttar Pradesh (IN)

(72) Inventors: Ritvik Kulshrestha, Uttar Pradesh (IN); Gaurav Sharma, Uttar Pradesh (IN); Deep Dwivedi, Uttar Pradesh (IN); Abhra Das, Uttar Pradesh (IN); Suman Gadhawal, Uttar Pradesh (IN); Vipin Tripathi, Uttar Pradesh (IN)

(73) Assignee: Extramarks Education India Pvt Ltd., Uttar Pradesh (IN)

(*) Notice: Subject to any disclaimer, the term of this patent is extended or adjusted under 35 U.S.C. 154(b) by 186 days.

(21) Appl. No.: 17/638,452

(22) PCT Filed: Jan. 25, 2022

(86) PCT No.: PCT/IB2022/050617
§ 371 (c)(1),
(2) Date: Feb. 25, 2022

(87) PCT Pub. No.: WO2023/144575
PCT Pub. Date: Aug. 3, 2023

(65) Prior Publication Data
US 2023/0237273 A1    Jul. 27, 2023

(51) Int. Cl.
*G06F 40/30* (2020.01)
*G06F 40/129* (2020.01)
(Continued)

(52) U.S. Cl.
CPC .......... *G06F 40/30* (2020.01); *G06F 40/129* (2020.01); *G06F 40/263* (2020.01)

(58) Field of Classification Search
CPC ...... G06F 40/30; G06F 40/129; G06F 40/263; G06F 40/253; G06F 40/53; G06N 20/10; G06N 20/20; G06N 3/0464; G06N 3/09
See application file for complete search history.

(56) References Cited

U.S. PATENT DOCUMENTS

| 10,657,332 B2 * | 5/2020 | Zhang ............... G06F 40/58 |
| 2014/0244236 A1 * | 8/2014 | Johnson, III ........ G06F 9/454 704/2 |

(Continued)

*Primary Examiner* — Richemond Dorvil
*Assistant Examiner* — Mulugeta Tuji Dugda
(74) *Attorney, Agent, or Firm* — Kilpatrick Townsend & Stockton LLP

(57) ABSTRACT

System and method are provided for identification and classification of multilingual messages that would be considered inappropriate in an online interactive portal. The system may include processors to generate a set of data of intended inappropriate multilingual messages to train classification model. The set of data with labels is classified by assigning unique identifiers. The system includes pre-processing module to eliminate unwanted characters from set of data to train classification model. The classification model may be trained by multilingual representation module based at least in part on set of data with labels. The classification model determines whether set of data with one or more labels includes intended inappropriate multilingual messages. Furthermore, feedback loop module is utilised to retrain classification model recurrently to update set of data. The system is formed on Convolutional Neural Network (CNN) configured to classify multilingual messages as inappropriate in online interactive portal.

15 Claims, 5 Drawing Sheets

(51) Int. Cl.
*G06F 40/20* (2020.01)
*G06F 40/263* (2020.01)

(56) References Cited

U.S. PATENT DOCUMENTS

| | | | |
|---|---|---|---|
| 2015/0254566 A1* | 9/2015 | Chandramouli | G06N 20/10 |
| | | | 706/11 |
| 2019/0272323 A1* | 9/2019 | Galitsky | G06F 40/253 |
| 2020/0019561 A1* | 1/2020 | Doyle | G06F 16/287 |
| 2020/0349229 A1* | 11/2020 | Abudalfa | G06F 40/30 |
| 2021/0157872 A1* | 5/2021 | David | G06F 40/279 |
| 2021/0370188 A1* | 12/2021 | Thomas | A63F 13/79 |

* cited by examiner

SYSTEM AND METHOD FOR IDENTIFICATION AND CLASSIFICATION OF MULTILINGUAL MESSAGES IN AN ONLINE INTERACTIVE PORTAL

CROSS-REFERENCE TO RELATED APPLICATIONS

This application is a 371 U.S. National Phase Application of International Patent Application No. PCT/IB2022/050617, filed Jan. 25, 2022, which is herein incorporated by reference in its entirety for all purposes.

TECHNICAL FIELD OF THE DISCLOSURE

The present disclosure relates to a system and method for the identification and classification of multilingual messages that would be considered inappropriate in an online interactive portal.

BACKGROUND

Online chatbots are being increasingly used by various organisations for providing users with a variety of services like resolving queries of the users, taking users' feedback, answering FAQs, solving their doubts etc. In the Indian context, impatient and unruly users tend to send inappropriate multilingual messages to these automated systems. Therefore, it is impracticable to manually keep a check on all the users and report inappropriate messages received on the online automated systems. Additionally, it is impossible to manually penalize the unruly behaviour of users at every instance, and hence, not penalizing such actions encourages users and ruins the quality and flow of conversations on the automated platforms. Thus, there is an ardent need for a system that can detect, regulate, and keep a check on the inappropriate language being used by the users while interacting with the automated platforms.

A number of methods exist for detecting the use of inappropriate languages used by the users in different forms of texts, however, the detection of inappropriate words in various vernacular dialects such as English, Hindi, etc. is not supported by these automated systems. Further, to detect the use of inappropriate words in the different e-text, several solutions use algorithmic approaches. One such algorithmic approach known as a dictionary-based algorithmic approach is used by the various organisations, wherein the input text is filtered in a preprocessing pipeline to obtain slang words that are not present in an English dictionary. Further, the Machine Learning (ML) based solutions use complex ML models like Byte-Pair Encoding (BPE) and fastText classification to detect abusive language words in messages and texts. As another example, regular expressions may be used to identify language patterns that are correlated with abusive language. Unfortunately, many creative users become familiar and often find ways to circumvent the automated slang detection systems and evade the detection of abusive language. Many technologies have attempted to address the shortcomings of existing slang detection methods, but the need for a technology that can establish a good professional atmosphere for chatbot users remains.

In the present scenario, given the contextual nature of the messages on the platform, the process of classifying and identifying abusive messages has become even more challenging, without a proper automated slang detection system. Although there are a few slang detection solutions present, however, the existing work fails to utilise a framework for detecting Hindi-English code switched multilingual messages and in parallel retraining the model at regular intervals with a feedback loop mechanism. Therefore, there exists a need for an inappropriate language detection system that can overcome the shortcomings of the prior art by enabling the detection of inappropriate words even in multilingual messages using simple ML algorithms and minimal human validation, which would hence help in adding value to the online chatbot technology.

SUMMARY

The present disclosure aims at solving the problems described above.

The present disclosure discloses a system and method based on Convolutional Neural Network (hereinafter CNN) for identification and classification of multilingual messages that would be considered inappropriate in an online interactive portal. The system may comprise one or more processors with a memory for executing one or more computer programs to perform actions by operating on input data and generating output. Further, the one or more processors may generate a set of data of an intended inappropriate multilingual message to train a classification model. The set of data of the intended inappropriate multilingual message may indicate a set of text including, but not limited to, violence-inducing messages, offensive, hate speech, slang words, and profanity. Further, the set of data of the intended inappropriate multilingual messages may be classified with one or more labels by assigning one or more unique identifiers. The system may further comprise a pre-processing module communicatively coupled to the one or more processors, configured to eliminate one or more unwanted characters from the set of data to train the classification model. The classification model may be trained by a multilingual representation module, communicatively coupled to the one or more processors and the pre-processing module. The multilingual representation module may train the classification model based at least in part on the set of data with the one or more labels based on the one or more unique identifiers. Further, the classification model may determine whether the set of data with the one or more labels includes the intended inappropriate multilingual messages, at least in part, on the unique identifiers.

In an embodiment, the system may comprise a feedback loop module, communicatively coupled to the multilingual representation module. The feedback loop module may be configured to retrain the classification model recurrently to update the set of data of the intended inappropriate multilingual messages. The feedback loop module may update the set of data basis a confidence value, wherein the confidence value varies in the range from 0 to 1. The system may further include a memory storing computer-executable instructions, communicatively coupled to the one or more processors. The memory may be configured to store at least the set of data with the one or more labels based on the one or more unique identifiers to train the classification model.

In an embodiment, the present disclosure relates to a method based on CNN for identification and classification of multilingual messages that would be considered inappropriate in an online interactive portal. The method may generate a set of data of an intended inappropriate multilingual messages to train a classification model via one or more processors. The one or more processors may further classify the set of data with one or more labels by assigning one or more unique identifiers. Further, the set of data may comprise the multilingual messages in various vernacular dialects such as Hindi, English, etc. The set of data may be classified with the one or more labels, including but not limited to, a class label, a flag label, and a language label. The class label based on the one or more unique identifiers may be configured to classify the set of data as "offensive" or "non-offensive". Further, the flag label may be configured to classify the set of data that may include non-roman alphabets/numerals, including the multilingual messages containing any user's personal information which may lead to the identification of the user or may include the multilingual messages that may be entirely incomprehensible. Furthermore, the language label may be configured to classify the set of data in the various vernacular dialects such as Hindi, English, etc.

In some implementations, the method may retrain the classification model using a feedback loop module. The feedback loop module may retrain the classification model recurrently basis the updated set of data of the intended inappropriate multilingual messages using the confidence value. The confidence value may vary in the range of 0 to 1. Further, when the confidence value is greater than a value of 0.9, the feedback loop module may retrain the classification model recurrently basis the updated set of data. Furthermore, the feedback loop module may verify the intended inappropriate multilingual message of a user by an administrator before updating the set of data to retrain the classification model when the confidence value is less than a value of 0.9. Because the system may be formed on CNN, the classification model can increase the performance and may effectively determine the set of data with the one or more labels including the intended inappropriate multilingual messages.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

The accompanying drawings are incorporated herein and form a part of the disclosure.

DETAILED DESCRIPTION OF THE DRAWINGS

Figure 1:
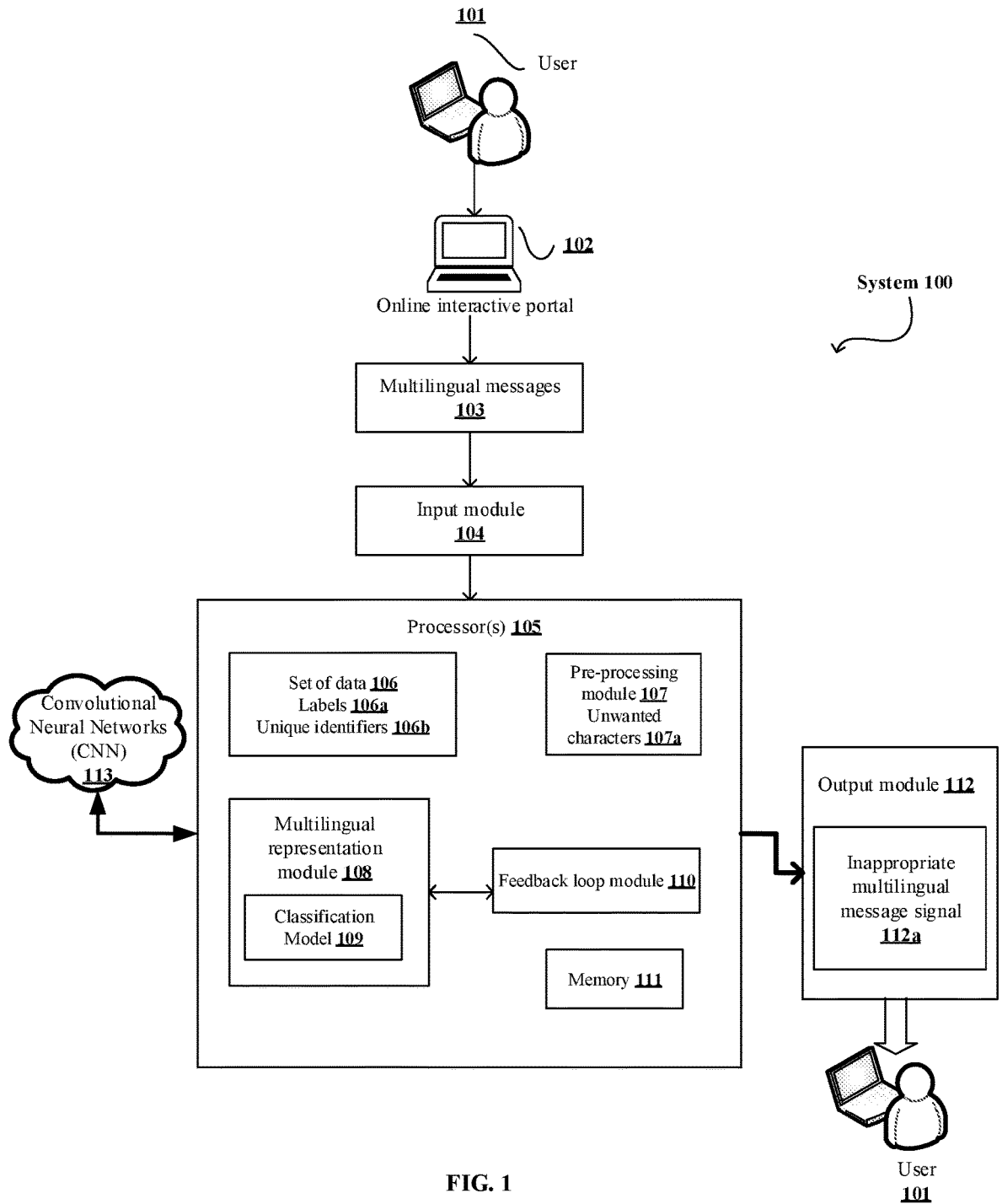
FIG. 1 depicts a system for the identification and classification of multilingual messages that would be considered inappropriate in an online interactive portal.

While the disclosure has been disclosed with reference to certain embodiments, it will be understood by those skilled in the art that various changes may be made, and equivalents may be substituted without departing from the scope of the disclosure. In addition, many modifications may be made to adapt to a particular situation or material to the teachings of the disclosure without departing from its scope.

Throughout the disclosure and claims, the following terms take the meanings explicitly associated herein unless the context clearly dictates otherwise. The meaning of "a", "an", and "the" include plural references. The meaning of "in" includes "in" and "on". Referring to the drawings, as numbers indicate like parts throughout the views. Additionally, a reference to the singular includes a reference to the plural unless otherwise stated or inconsistent with the disclosure herein.

The term "set of data" includes the multilingual messages in various vernacular dialects including, but not limited to, Hindi, English, etc. Further, the set of data may include a set of text posted on at least one of a message board forum, a chatbot, a blog, or an article. The set of text may include at least one of violence-inducing messages, toxic/offensive language, hate speech, and/or profanity.

The term "online interactive portal" shall mean any type of message board forum, a chatbot, a blog, a website, or an article, which is used by the users to post their thoughts, issues, queries, etc.

The term "Deep Learning" refers to a class of machine learning algorithms that uses multiple layers to progressively extract higher-level features from the raw input. Deep learning allows capturing difficult language structures and can perform sentiment analysis. Further, deep learning methods support automatic detection and identification of slang from natural sentences using a combination of bidirectional recurrent neural networks, conditional random field, and multilayer perceptron.

The term "Convolution Neural Network" (CNN) refers to a deep learning algorithm that may provide a binary representation of the input comprising the offensive and non-offensive text. Various models may be employed based on CNN for learning high-quality continuous vector representation from a large corpus of text consisting of billions of words. The models may be utilised for hate-speech categorisation that may be fed to the CNN to predict the categories of each tweet. In this disclosure, the term "Convolutional Neural Network" may refer to a pre-trained neural network or neural network that is to be trained.

Various embodiments of these features will now be discussed with respect to the corresponding FIGS. 1-5.

FIG. 1 illustrates a system 100 for identification and classification of multilingual messages 103 that would be considered inappropriate in an online interactive portal 102 enabling and/or providing implementation of one or more embodiments of the present disclosure. The system 100 may include a user 101, interacting on the online interactive portal 102. Further, an input module 104 may be configured to receive the multilingual message 103 by the user 101 through the online interactive portal 102. The system 100 may further include one or more processor(s) 105 configured to generate a set of data 106 of the intended inappropriate multilingual messages 103 to train a classification model 109. The set of data 106 may be classified with one or more labels 106a by assigning one or more unique identifiers 106b. The system 100 may further comprise a pre-processing module 107 communicatively coupled to the one or more processor(s) 105, configured to eliminate one or more unwanted characters 107a from the set of data 106 to train the classification model 109. The classification model 109 may be trained by a multilingual representation module 108, communicatively coupled to the one or more processor(s) 105 and the pre-processing module 107. The multilingual representation module 108 may train the classification model 109 based at least in part of the set of data 106 with the one or more labels 106a based on the one or more unique identifiers 106b.

The system 100 may further comprise a feedback loop module 110, communicatively coupled to the multilingual representation module 108. The feedback loop module 110 may be configured to retrain the classification model 109 recurrently basis the updated set of data 106 of the intended inappropriate multilingual messages 103. The feedback loop module 110 may update the set of data 106 bases a confidence value, wherein the confidence value varies in the range of 0 to 1. The system 100 may further include a memory 111 storing computer-executable instructions, communicatively coupled to the one or more processor(s) 105. Furthermore, an output module 112 may output an inappropriate multilingual message signal 112a to the user 101 on the identification of the multilingual message 103 that would be considered inappropriate in the online interactive portal 102.

The processor(s) 105 may be implemented as one or more microprocessor(s), microcomputers, digital signal processor(s), central processing units, state machines, and/or any device that manipulates data based on operational instructions. Further, the processor(s) 105 may be configured to fetch and execute computer-readable instructions stored in a memory 111.

The system 100 may also include the memory 111. The memory 111 may be coupled to the processor(s) 105. The memory 111 may include any computer-readable medium, for example, volatile memory, such as Static Random Access Memory (SRAM), and Dynamic Random Access Memory (DRAM), and/or non-volatile memory, such as Read-Only Memory (ROM), flash memories, optic disks, and magnetic tapes.

Further, the memory 111 may be configured to store at least the set of data 106 with the one or more labels 106a based on the one or more unique identifiers 106b to train the classification model 109.

Further, the system 100 may be trained using CNN 113. The CNN 113 may be a multi-layer network trained to perform a specific task using classification. The CNN 113 may automatically identify inappropriate text, including simple profanity lexicons. Further, CNN 113 may identify the inappropriate text in various vernacular dialects. The CNN 113 may include a set of encoders and classifiers to generate the representation based on the text received. Using CNN 113 may also allow the text-based classifiers to better classify subtle and/or ambiguous hate speech that does not have the strong surface features of explicit hate speech.

Figure 2:
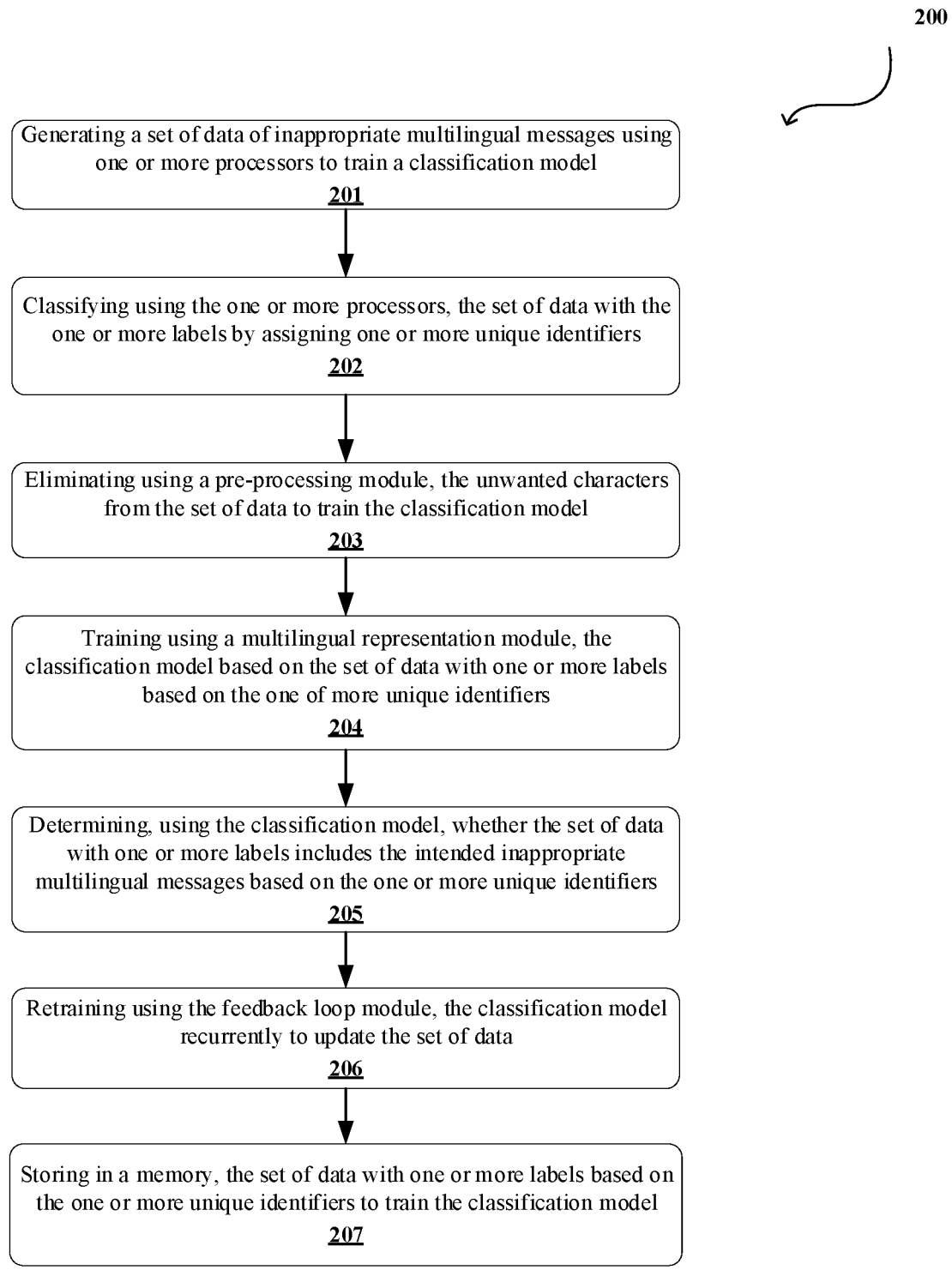
FIG. 2 illustrates a flowchart of a method for the identification and classification of multilingual messages that would be considered inappropriate in an online interactive portal.

FIG. 2 is a simplified flow diagram illustrating a method 200 for the identification and classification of the multilingual messages 103 that would be considered inappropriate in the online interactive portal 102. As illustrated in FIG. 2, the method 200 includes one or more blocks implemented by the system 100 for the identification and classification of the multilingual messages 103. The method 200 may be described in the general context of computer-executable instructions performed by the one or more processor(s) 105 and various modules, including but not limited to, the pre-processing module 107, the multilingual representation module 108, and the feedback loop module 110. Generally, the set of computer-executable instructions can include procedures, modules, and functions, which perform functions or implement abstract data types.

The order in which the method 200 is described, is not intended, to be construed as a limitation, and any number of the described method blocks can be combined in any order to implement the method 200. Further, the method 200 can be implemented in any suitable software, firmware, or combination thereof.

The method 200 may start at step 201 with the generation of the set of data 106 of the intended inappropriate multilingual messages 103 to train the classification model 109 using the one or more processor(s) 105. The set of data 106 of the intended inappropriate multilingual message 103 may indicate a set of text including, but not limited to, violence-inducing messages, offensive, hate speech, slang words, and profanity. Further, the set of data 106 may comprise the multilingual messages 103 in various vernacular dialects such as Hindi, English, etc. Furthermore, the one or more processor(s) 105 at step 202 may classify the set of data 106 with the one or more labels 106a by assigning the one or more unique identifiers 106b.

At step 203, the pre-processing module 107, communicatively coupled to the one or more processor(s) 105, may be configured to eliminate the one or more unwanted characters 107a from the set of data 106 to train the classification model 109. The one or more unwanted characters 107a may include one of the punctuation marks, links/hyperlinks, extra spaces, numbers, usernames, etc.

At step 204, the classification model 109 may be trained using the multilingual representation module 108 based on the set of data 106 with the one or more labels 106a based on the one or more unique identifiers 106b. Further, the classification model 109 may be generated by at least one deep-learning approach 113-1(n). The classification model 109 may be trained using the multilingual representation module 108, wherein the set of data 106 may be provided in the form of tokens to an encoder to convert into the vector form. The classification model 109 may be bidirectionally trained by the multilingual representation module 108, resulting in a deeper sense of language context and flow than single-direction language modules. Further, three sets of embedding may be generated before the set of data 106 is inputted to the encoder, including, but not limited to, token embeddings, segment embeddings, and position embeddings. The embeddings are then passed into the encoder function to get the final bidirectional representation of the set of data 106. Further, the multilingual representation module 108 may be generated on transliterated data as well, a phenomenon commonly observed in various vernacular dialects. The multilingual representation module 108 may represent the set of data 106 in numerous languages, in order to train the classification model 109.

The trained classification model 109 may represent a single model or an ensemble of base-level classification models and may be implemented as any type of deep learning model. For example, the suitable classification model 109 for use with the techniques and system described herein, include, without limitation, Support Vector Machines (SVM), K Nearest Neighbors (KNN), Multinomial Naive Bayes (MNB), Decision Tree (DT), Random Forest (RF), and Logistic Regression (LR).

At step 205, the classification model 109 may determine whether the set of data 106 with the one or more labels 106a includes the intended inappropriate multilingual messages 103 based on the one or more unique identifiers 106b.

At step 206, the classification model 109 may be retrained recurrently by using the feedback loop module 110, to update the set of data 106 of the intended inappropriate multilingual messages 103. The feedback loop 110 may update the set of data 106 bases the confidence value, wherein the confidence value varies in the range of 0 to 1. Further, at step 207, the set of data 106 with the one or more labels 106a based on the one or more unique identifiers 106b may be stored in the memory 111 to train the classification model 109.

Figure 3:
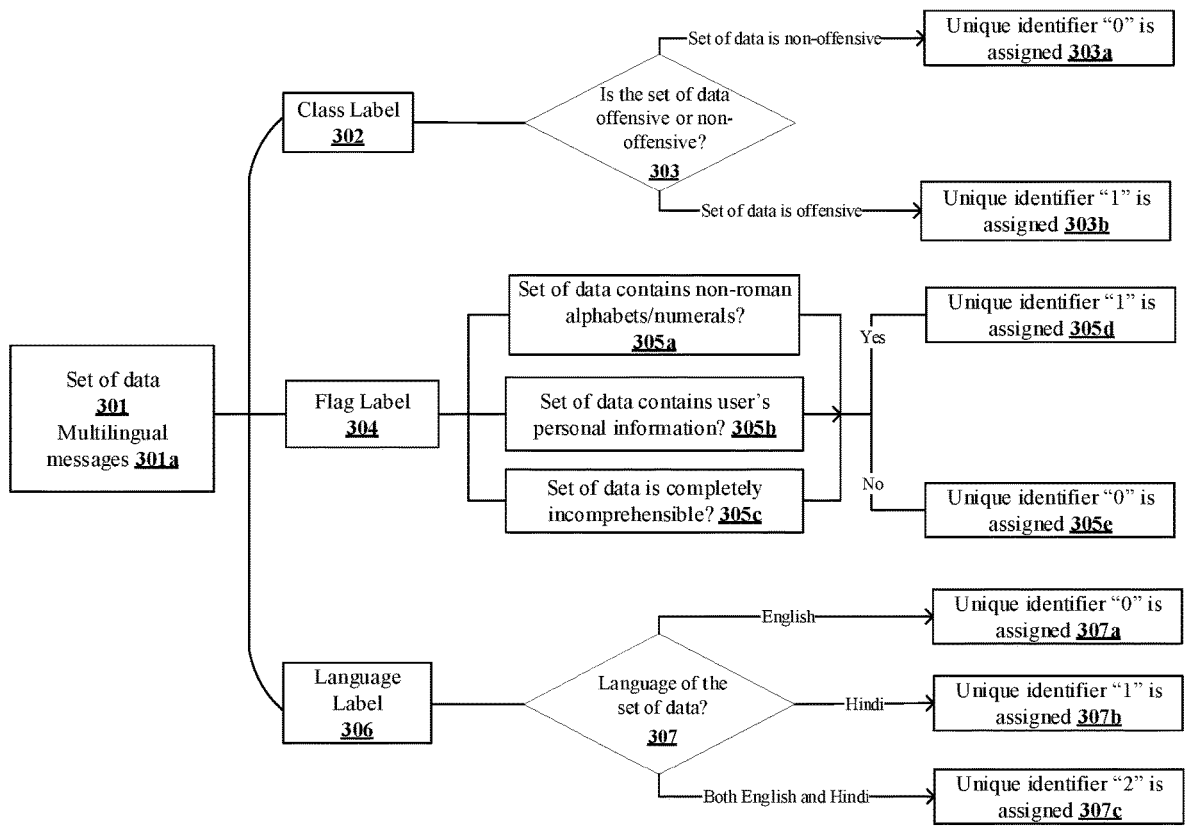
FIG. 3 depicts the classification of a set of data of an intended inappropriate multilingual messages with one or more labels.

FIG. 3 depicts the classification of a set of data 301 of an intended inappropriate multilingual messages 301a with the one or more labels 106a by the one or more processor(s) 105. The one or more processors 105 may classify the set of data 301 with the one or more labels 106a by assigning one or more unique identifiers 106b. The set of data 301 may be classified with the one or more labels 106a, including but not limited to, a class label 302, a flag label 304, and a language label 306. Further, the one or more unique identifiers 106b associated with the one or more labels 106a of the set of data 301 may be represented using numerical values, e.g., 0, 1, or 2.

In embodiments, the class label 302 based on the one or more unique identifiers 106b may be configured to classify the set of data 301 as "offensive" or "non-offensive" at 303. The set of data 301 of the intended inappropriate multilingual messages 301a may be classified as "non-offensive" by the class label 302 by assigning the unique identifier 106b as zero (0) at 303a and may be classified as "offensive" by assigning the unique identifier 106b as one (1) at 303b.

Additionally, to minimise the ambiguity and maintain consistency in the class label 302, the unique identifiers 106b may be provided with various guidelines to tackle different scenarios. For example, if the set of data 301 of the intended multilingual messages 301a appears to be completely harmless or contains a question with no slang or abusive words, the intended inappropriate multilingual messages 301a may be classified as "non-offensive" by assigning the unique identifier 106b as zero (0). Further, the class label 302 may be provided with the benefit of the doubt, in scenarios where anything inappropriate shouldn't be asked, for instance, in a formal or school setting.

Further, the flag label 304 may be configured to classify the set of data 301 of the intended inappropriate multilingual messages 301a that may include non-roman alphabets/numerals at 305a, may include the multilingual messages 103 containing any user's 101 personal information which may lead to the identification of the user 101 at 305b, or may include the multilingual messages 103 that may be entirely incomprehensible at 305c. The set of data 301 that may include non-roman alphabets/numerals at 305a, user's personal information at 305b, or is entirely incomprehensible at 305c may be assigned the unique identifier 106b as one (1) at 305d or may otherwise be assigned the unique identifier 106b as zero (0) at step 305e.

Furthermore, the language label 306 may be configured to classify the set of data 301 of the intended inappropriate multilingual messages 301a in the various vernacular dialects such as Hindi, English, etc. at 307. The unique identifier 106b as zero (0) at 307a may be assigned to the set of data 301 by the language label 306 if the intended inappropriate multilingual messages 301a are in the "English language". Further, if the intended inappropriate multilingual messages 301a are in the "Hindi language", the unique identifier 106b as one (1) may be assigned to the set of data 301 at 307b. Additionally, the set of data 301 comprising the intended inappropriate multilingual messages 301 both in "English" and "Hindi" language may be assigned the unique identifier 106b as two (2) to the set of data 301 at 307c by the language label 306.

Figure 4:
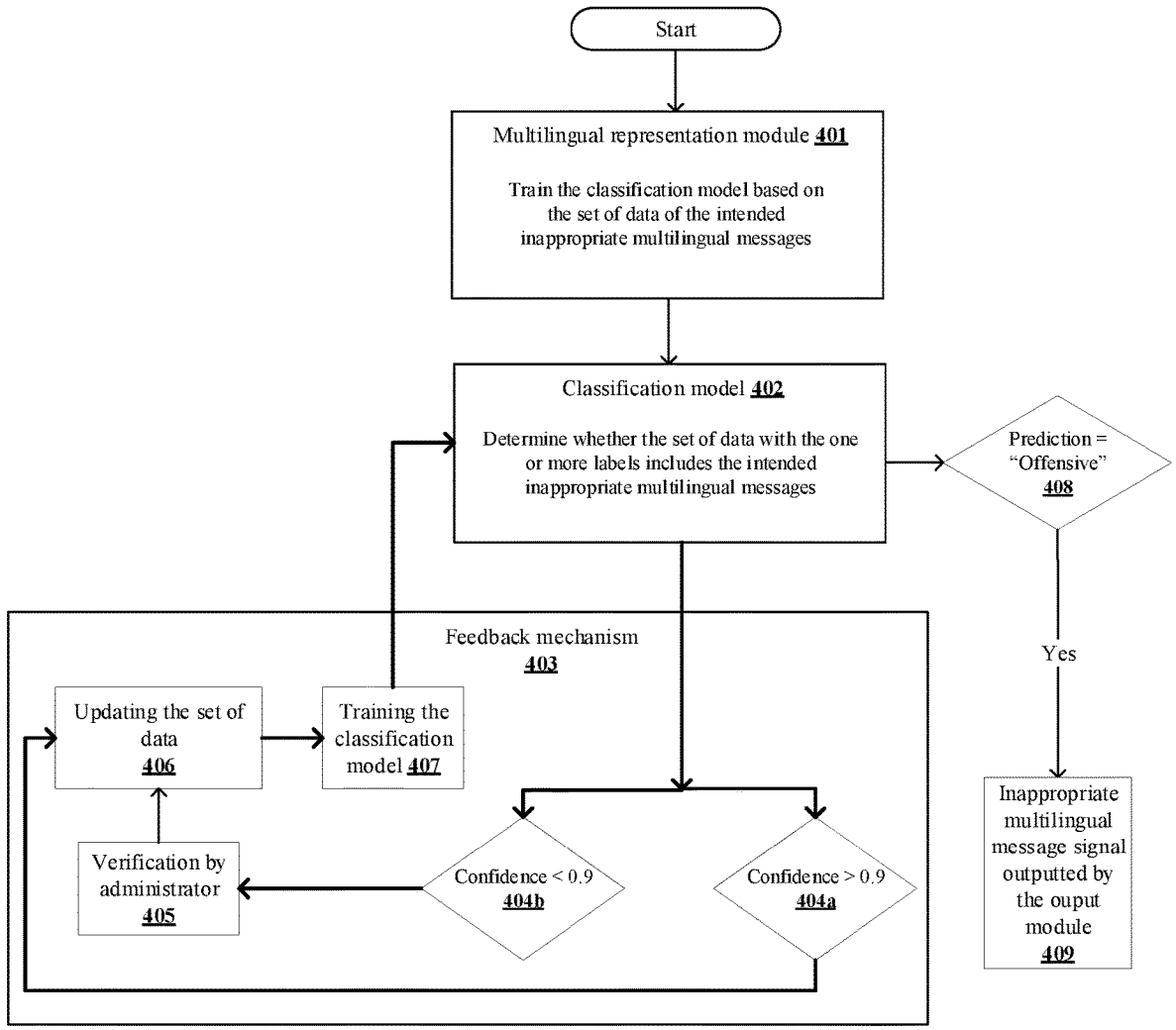
FIG. 4 depicts a feedback mechanism employed by a feedback loop module to retrain a classification model.

FIG. 4 illustrates the feedback mechanism 403 employed by the feedback loop module 110 to retrain the classification model 109, wherein the multilingual representation module 108 used for training the classification model 109 is communicatively coupled to the feedback loop module 110. As illustrated, the multilingual representation module 108 may train the classification model 109 based on the set of data 106 with the one or more labels 106a based on the one or more unique identifiers 106b at 401.

In an embodiment, the classification model 109 at 402 may determine whether the set of data 106 with the one or more labels 106a includes the intended inappropriate multilingual messages 103. Further, if the set of data 106 with the one or more labels 106a is predicted to be offensive by the classification model 109 at 408, the inappropriate multilingual message signal 112a is outputted by the output module 112 at 409.

Further, the classification model 109 may be retrained recurrently by the feedback loop module 110, to update the set of data 106 of the intended inappropriate multilingual messages 103. The feedback loop module 110 may update the set of data 106 bases the confidence value, wherein the confidence value varies in the range of 0 to 1. Further, when the confidence value is greater than a value of 0.9 at 404a, the feedback loop module 110 may retrain the classification model 109 at 407 recurrently basis the updated set of data 106 at 406. Furthermore, the feedback loop module 110 may verify the intended inappropriate multilingual messages 103 of the user 101 by the administrator at 405 before updating the set of data 106 to retrain the classification model 109 at 407 when the confidence value is less than a value of 0.9 at 404b. It is to be appreciated that, to retrain the classification model 109, the feedback loop module 110 may utilise more than just administrator verification from a single administrator. Accordingly, many different administrators at 405 may provide verification of the intended inappropriate multilingual messages 103, and this verification may be aggregated and used by the feedback loop module 110 to retrain the classification model 109. Further, the feedback loop module 110 may retrain the classification model 109 every time the intended inappropriate multilingual message 103 is received by the classification model 109 to enhance the performance of the classification model 109 and accuracy of prediction.

The training of the system 100 having the processor(s) 105 with the memory 111 for executing one or more computer-executable instructions may be performed by utilising various deep learning approaches such as CNN 113. Various CNN 113 approaches may be applied for text classification and abusive text detection. The text present in the intended inappropriate multilingual messages 103 may be represented by a set of word embeddings which are then mapped through a variety of convolutional filters of different sizes. Afterwards, the complexity of the CNN 113 is reduced to prevent overfitting. The superiority of the CNN 113 is its ability to mine the relations in the contextual windows and capture the 'local' information such as semantic clues through the convolutional filters. Further, other variations such as Recurrent Neural Network (RNN) 113-1($n$) may be applied for the classification of multilingual messages 103. RNN 113-1($n$) shows more superiority for the text and sentiments classification.

Figure 5:
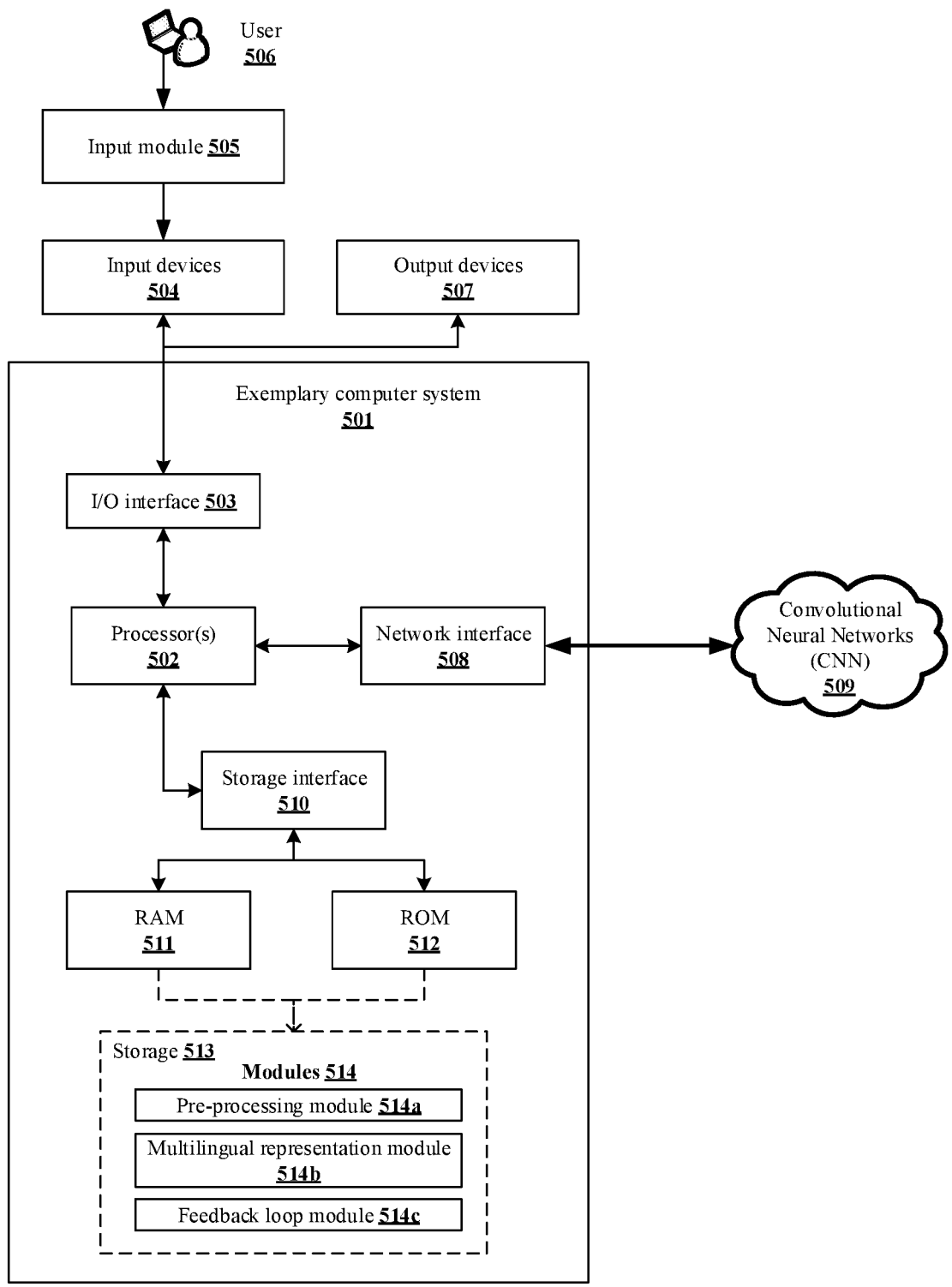
FIG. 5 illustrates an exemplary block diagram of a computer system for implementing embodiments consistent with the present disclosure.

FIG. 5 illustrates a block diagram of an exemplary computer system 501 for implementing embodiments consistent with the present disclosure.

In an embodiment, the computer system 501 may be the system 100 for the identification and classification of multilingual messages 103 that would be considered inappropriate in the online interactive portal 102. The computer system 501 may include a central processing unit ("CPU" or "processor") 502. The processor 502 may include processing units such as integrated system (bus) controllers, memory management control units, floating units, digital signal processing units, etc.

The processor 502 may be in communication with one or more input devices 504 namely an input module 505, along with one or more users 506 via I/O interface 503. The processor 502 may be in communication with output devices 507 via the I/O interface 503. The I/O interface 503 may employ communication protocols/methods such as, without limitation, audio, analog, digital, stereo, IEEE-1394, serial bus, Universal Serial Bus (USB), Radio Frequency (RF) antennas, S-Video, Video Graphics Array (VGA), IEEE 802.n/b/g/n/x, Bluetooth, cellular (e.g., Code-Division Multiple Access (CDMA), High-Speed Packet Access (HSPA+), Global System for Mobile Communications (GSM), Long-Term Evolution (LTE) or the like), etc. Using a network server 508, the computer system 501 may be connected to Convolutional Neural Network (CNN) 509.

In some embodiments, the processor 502 may be disposed of in communication with a storage 510 e.g., RAM 511, and ROM 512, etc., via a storage interface 510. The storage interface 510 may connect to storage 513 including, but not limited to, memory drives, removable disc drives, etc., employing connection protocols such as Serial Advanced Technology Attachment (SATA), Integrated Drive Electronics (IDE), IEEE-1394, Universal Serial Bus (USB), fiber channel, Small Computer Systems Interface (SCSI), etc. The memory drives may further include a drum, magnetic disc drive, magneto-optical drive, optical drive, Redundant Array of Independent Discs (RAID), solid-state memory devices, solid-state drives, etc.

The storage 513 may store a collection of one or more module(s) 514, including, but not limited to, a pre-processing module 514a, a multilingual representation module 514b, and a feedback loop module 514c.

Thus, the system and method for the identification and classification of the multilingual messages that would be considered inappropriate in the online interactive portal have been described. Although embodiments have been described with reference to specific example embodiments, it will be evident that various modifications and changes can be made to these example embodiments without departing from the broader spirit and scope of the present application. Accordingly, the specification and drawings are to be regarded in an illustrative rather than a restrictive sense.

As described above, the module(s), amongst other things, include routines, programs, objects, components, and data structures, which perform particular tasks or implement particular abstract data types. The module(s) may also be implemented as, signal processor(s), state machine(s), logic circuitries, and/or any other device or component that manipulate signals based on operational instructions. Further, the modules can be implemented by one or more hardware components, by computer-readable instructions executed by a processing unit(s), or by a combination thereof.

It is intended that the disclosure and examples be considered as exemplary only, with a true scope of disclosed embodiments being indicated by the following claims.

The invention claimed is:

1. A system for identification and classification of multilingual messages that would be considered inappropriate in an online interactive portal, the system comprising:
one or more processors to:
generate a set of data of intended inappropriate multilingual messages to train a classification model, wherein the set of data comprises the intended inappropriate multilingual messages in various vernacular dialects;
classify the set of data with one or more labels by assigning one or more unique identifiers;
a pre-processing module, communicatively coupled to the one or more processors, to:
eliminate one or more unwanted characters from the set of data to train the classification model;
a multilingual representation module, communicatively coupled to the one or more processors and the pre-processing module, to:
train the classification model based at least in part on the set of data with the one or more labels based on the one or more unique identifiers, the classification model being generated by at least one deep-learning-based approach;
determine by the classification model whether the set of data with the one or more labels includes the intended inappropriate multilingual messages, at least in part, on the unique identifiers;
a feedback loop module, communicatively coupled to the multilingual representation module, to:
retrain the classification model recurrently to update the set of data;
a memory storing computer-executable instructions, communicatively coupled to the one or more processors, to:
store at least the set of data with the one or more labels based on the one or more unique identifiers to train the classification model, and
wherein the system is formed on a Convolutional Neural Network (CNN) configured to classify the multilingual messages as inappropriate in the online interactive portal.

2. The system according to claim 1, wherein the multilingual messages in the online interactive portal are a set of text posted on at least one of a message board forum, a chatbot, a blog, or an article.

3. The system according to claim 1, wherein the various vernacular dialects comprises Hindi, English, etc.

4. The system according to claim 1, wherein the classification of the set of data with the one or more labels indicates that the set of text includes at least one of violence-inducing messages, offensive, hate speech, or profanity.

5. The system according to claim 1, wherein the computer-executable instructions, when executed by the one or more processors, further classify the set of data with the one or more labels based on the one or more unique identifiers, wherein the one or more labels further comprising:
a class label based on the one or more unique identifiers configured to classify the set of data as offensive or non-offensive;
a flag label based on the one or more unique identifiers configured to classify whether the set of data includes non-roman alphabets/numerals or is entirely incomprehensible; and
a language label based on the one or more unique identifiers configured to classify the set of data in the various vernacular dialects such as Hindi, English, etc.

6. The system according to claim 1, wherein the unique identifiers associated with the one or more labels of the set of data is a numerical value (e.g., 0, 1, or 2).

7. The system according to claim 1, wherein the unwanted characters eliminated from the set of data includes at one of punctuation marks, links/hyperlinks, extra spaces, numbers, etc.

8. The system according to claim 1, wherein the classification model based on the set of data of the intended inappropriate multilingual messages is generated by using the at least one deep-learning-based approach such as Support Vector Machines (SVM), K Nearest Neighbors (KNN), Decision Tree (DT), Random Forest (RF), etc.

9. The system according to claim 1, wherein the feedback loop module retrains the classification model recurrently to update the set of data basis a confidence value, wherein the confidence value varies in the range from 0 to 1,
wherein the feedback loop module updates the set of data to retrain the classification model when the confidence value is greater than to a value of 0.9, and
wherein the feedback loop module verifies the intended inappropriate multilingual messages by an administrator before updating the set of data to retrain the classification model when the confidence value is less than to a value of 0.9.

10. A method for identification and classification of multilingual messages that would be considered inappropriate in an online interactive portal, the method comprising:
generating, via one or more processors, a set of data of intended inappropriate multilingual messages to train a classification model, wherein the set of data comprises the intended inappropriate multilingual messages in various vernacular dialects;
classifying, via the one or more processors, the set of data with one or more labels by assigning one or more unique identifiers;
eliminating, via a pre-processing module, one or more unwanted characters from the set of data to train the classification model;
training, via a multilingual representation module, the classification model based at least in part on the set of data with the one or more labels based on the one or more unique identifiers, the classification model being generated by at least one deep-learning-based approach;
determining, via the classification model, whether the set of data with the one or more labels includes the intended inappropriate multilingual messages, at least in part, on the unique identifiers;
retraining, via a feedback loop module, the classification model recurrently to update the set of data;
storing, in a memory, at least the set of data with the one or more labels based on the one or more unique identifiers to train the classification model, and
wherein the method is formed on a Convolutional Neural Network (CNN) configured to classify the multilingual messages as inappropriate in the online interactive portal.

11. The method according to claim 10, further comprising classifying the set of data with the one or more labels based on the one or more unique identifiers, wherein the one or more labels further comprising:
a class label based on the one or more unique identifiers configured to classify the set of data as offensive or non-offensive;
a flag label based on the one or more unique identifiers configured to classify whether the set of data includes non-roman alphabets/numerals or is entirely incomprehensible; and
a language label based on the one or more unique identifiers configured to classify the set of data in the various vernacular dialects such as Hindi, English, etc.

12. The method according to claim 10, wherein the unique identifiers associated with the one or more labels of the set of data is a numerical value (e.g., 0, 1, or 2).

13. The method according to claim 11, wherein the class label based on the one or more unique identifiers is configured to:
classify the set of data as non-offensive by assigning the unique identifier as zero (0); and
classify the set of data as offensive by assigning the unique identifier as one (1).

14. The method according to claim 11, wherein the flag label based on the one or more unique identifiers is configured to:
classify the set of data containing the non-roman alphabets/numerals, or is entirely incomprehensible by assigning the unique identifier as one (1); and
classify the set of data containing any other information by assigning the unique identifier as zero (0).

15. The method according to claim 11, wherein the language label based on the one or more unique identifiers is configured to:
classify the set of data in English language by assigning the unique identifier as zero (0);
classify the set of data in Hindi language by assigning the unique identifier as one (1); and
classify the set of data in both English and Hindi language by assigning the unique identifier as two (2).

* * * * *